(12) United States Patent
Min (10) Patent No.: US 6,184,907 B1
(45) Date of Patent: Feb. 6, 2001

(54) GRAPHICS SUBSYSTEM FOR A DIGITAL COMPUTER SYSTEM

(75) Inventor: Byung-Gueon Min, Kunpo-shi (KR)

(73) Assignee: Samsung Electronics Co., LTD (KR)

( * ) Notice: Under 35 U.S.C. 154(b), the term of this patent shall be extended for 0 days.

(21) Appl. No.: 09/102,807

(22) Filed: Jun. 23, 1998

(30) Foreign Application Priority Data

Jun. 25, 1997 (KR) .................................................. 97-27273

(51) Int. Cl.⁷ .................................................... G06F 13/16
(52) U.S. Cl. ........................... 345/521; 345/523; 345/511
(58) Field of Search .................................. 345/501–503, 345/521, 523, 526, 507, 509, 515, 513, 508, 511

(56) References Cited

U.S. PATENT DOCUMENTS

| 5,291,275 | * | 3/1994 | Lumelsky | 348/441 |
| 5,430,486 | * | 7/1995 | Fraser et al. | 348/426 |
| 5,786,866 | * | 7/1998 | Sani et al. | 348/520 |
| 5,808,629 | * | 9/1998 | Nally et al. | 345/508 |
| 5,929,924 | * | 7/1999 | Chen | 348/552 |
| 5,963,192 | * | 10/1999 | Wong et al. | 345/150 |
| 6,002,446 | * | 12/1999 | Eglit | 348/581 |
| 6,014,125 | * | 1/2000 | Herbert | 345/127 |
| 6,028,589 | * | 2/2000 | Mehra et al. | 345/154 |

* cited by examiner

Primary Examiner—Ulka J. Chauhan
(74) Attorney, Agent, or Firm—Samuels, Gauthier & Stevens LLP (57) ABSTRACT

A graphics subsystem utilizes a single port DRAM as a frame buffer, which has an r-bit wide data access port and stores video data that are generated by an application program executed on a host processor. The graphics subsystem includes a first-in first-out (FIFO) buffer for storing the video data from the frame buffer, and a scan interpolator for performing vertical and horizontal interpolation of data read from the FIFO buffer with respect to a predetermined number of adjacent scan lines on a video frame. By interpolating adjacent scan lines in real time, it is possible to obtain high-quality images on a computer or television display.

25 Claims, 7 Drawing Sheets

GRAPHICS SUBSYSTEM FOR A DIGITAL COMPUTER SYSTEM

BACKGROUND OF THE INVENTION

In modern data processing systems, for example personal computers (PCs) and workstations, graphics subsystems perform the task of graphic data processing. Graphic data is exchanged between a host processor (CPU) and a video display device such as a cathode ray tube (CRT) device, a liquid crystal display (LCD) device, or the like. Display devices commonly support one or more pixel resolutions, for example, VGA mode (640×480 pixels), Super VGA (SVGA) mode (800×600), and Extended Graphics Array (XGA) mode (1024×768). With the advent of high-powered processors, for example Pentium™ processors and increasingly-sophisticated operating systems, for example Windows™ operating systems, capable of absorbing hardware differences, graphics subsystems have been integrated into a single chip so as to reduce their production costs and power consumption. These integrated graphics chips are commonly referred to as "graphics accelerators".

Graphics accelerators commonly employ multi-port Video RAMs (VRAMs), which include an additional serial port for faster throughput and are therefore suitable for use in high-end applications. To further improve performance, contemporary systems include integrated circuits which improve system speed and conserve space by integrating larger parts of the graphics subsystem, either the logic and standard dynamic RAM (DRAM) separately or the entire subsystem, into the DRAM. These integrated graphics systems are developed for portable applications such as notebook size computers. These forms of RAM are referred to as "multiported" because they include two ports which provide different functions: the random port interfaces with the processor or controller; the serial port provides fast data to the video display devices by means of a wide parallel transfer internal to the RAM. A serial register required for the serial port increases the cost of the VRAM, however, and the larger, more expensive package size resulting from the dual ports, and therefore increased pin count, consumes more space on the PC board. The testing procedure is also more complex for the multi-port VRAM which increases manufacturing costs.

The data rate of the single-port DRAM has increased significantly with the introduction of the Extended Data Out mode, (EDO) or Hyperpage mode, and with the introduction of synchronous DRAMs with very wide interfaces. This has led to the increased use of fast, wide, single port DRAMs in graphics subsystems, coupled with the use of standard graphics accelerators which provide the multi-port interface to the processor and the RAMDAC (Random Access Memory Digital-to-Analog Computer). Many single-port DRAM variants are also being developed such as the synchronous graphics DRAMs and the Multi-bank DRAM.

To effectively communicate with single port DRAMs for computer graphics, graphics accelerators usually include a first-in first-out (FIFO) buffer. In a graphics accelerator with a FIFO buffer, a certain amount of video data, for example the capacity of the FIFO, is read from a frame buffer into the FIFO buffer, where it is passed on to a video display device. The frequency of access of the graphics accelerator to the FIFO buffer is therefore determined by the FIFO capacity A higher FIFO access frequency decreases the frame buffer access time of the CPU. This, in turn, causes considerable system performance degradation, particularly, in the case where a single-port RAM is employed as a frame buffer.

With the advent of high-definition television (HDTV) and large screen television (TV) and the rapid advancement of multimedia PCs, there is a heightened demand for graphics accelerators suitable for use with television video signals. To meet this demand, graphics accelerators now include video encoders which convert computer video signals into video signals suitable for television. A graphics accelerator with a. video encoder is capable of displaying computer-processed images on a television screen, by transferring video data stored in frame buffer to a television via a FIFO buffer. However, when computer video data in the form of widely used progressive scan or non-interlaced formats is converted by a video encoder into interlace-scan television video data for display on a television screen, flickers visible to the human eye occur, which adversely affects image quality.

SUMMARY OF THE INVENTION

It is therefore an object of the present invention to provide a graphics system for use with a digital computer system capable of displaying high-quality images on a display screen by performing real-time interpolation of video data. Particularly, the present invention is applicable to graphics systems utilizing single-port memories as frame buffers.

According to an aspect of the present invention, a graphics subsystem utilizes a single port DRAM as a frame buffer. The frame buffer includes an r-bit wide data access port (where, r is a positive integer) that stores R (red), G (green), and B (blue) video data generated by an application program executed on a host processor. The graphics subsystem further includes a first-in first-out (FIFO) buffer for storing the video data from the frame buffer, and a scan interpolator for performing vertical and horizontal interpolation of data read from the FIFO buffer with respect to a predetermined number of adjacent scan lines, for example three lines on a video frame. A display controller generates a first control signal D_EN synchronized with a horizontal synchronizing signal and designating display enable periods. The FIFO buffer generates a second control signal M RQ when there exists at least one vacant storage location therein. A memory controller controls read and write operations of the frame buffer and FIFO buffer in response to the second control signal M_RQ from the FIFO buffer.

In a preferred embodiment, each scan line includes p scan blocks, where p is a positive integer. Each scan block is formed of q pixel data packets, and each pixel data packet is an r-bit wide video data corresponding to one or more pixels, where q and r are positive integers. The scan interpolator performs the interpolation of the video data associated with three adjacent scan lines. The memory controller controls the frame buffer in response to the second control signal M_RQ in such a manner that a first data of 3×q×r bits and a second data of 3×q×r bits, which correspond to first scan blocks of the three adjacent scan lines and second scan blocks of the three adjacent scan lines, respectively, are read out from the frame buffer sequentially and successively while the first control signal D_EN remains inactive. Also, the memory controller controls the frame buffer in response to the second control signal M RQ in such a manner that a third data of 3×q×r bits and a fourth data of 3×q×r bits, which correspond to odd-numbered scan blocks of the three adjacent scan lines and even-numbered scan blocks of the three adjacent scan lines, respectively, are read out from the frame buffer alternately and at a predetermined time interval while the first control signal D_EN remains active. The frame buffer preferably operates in a burst read out mode where q×r bits of data relating to each scan line are successively read out from the frame buffer.

The FIFO buffer preferably includes first and second storage regions which have identical storage capacity. The FIFO buffer stores the data read out of the frame buffer into the first and second storage regions sequentially in response to a third control signal W_EN from the memory controller while the first control signal D_EN remains inactive. While the first control signal D_EN remains active, the FIFO buffer provides 3×r bits of data, which are stored in one of the first and second storage regions and correspond to a column of the adjacent scan lines, to the scan interpolator in response to a fourth control signal R_EN from the display controller, and stores the data read out of the frame buffer in the other of the first and second storage regions in response to the third control signal W_EN. The scan interpolator performs vertical interpolation of pixel data corresponding to three pixels on a column of the three adjacent scan lines, thereafter it also performs a horizontal interpolation of pixel data with respect to adjacent three pixels on each vertically-interpolated scan line.

As described above, according to the invention, since adjacent scan lines on a video frame are interpolated in real time, it is possible to display high-quality images on a computer or television display.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
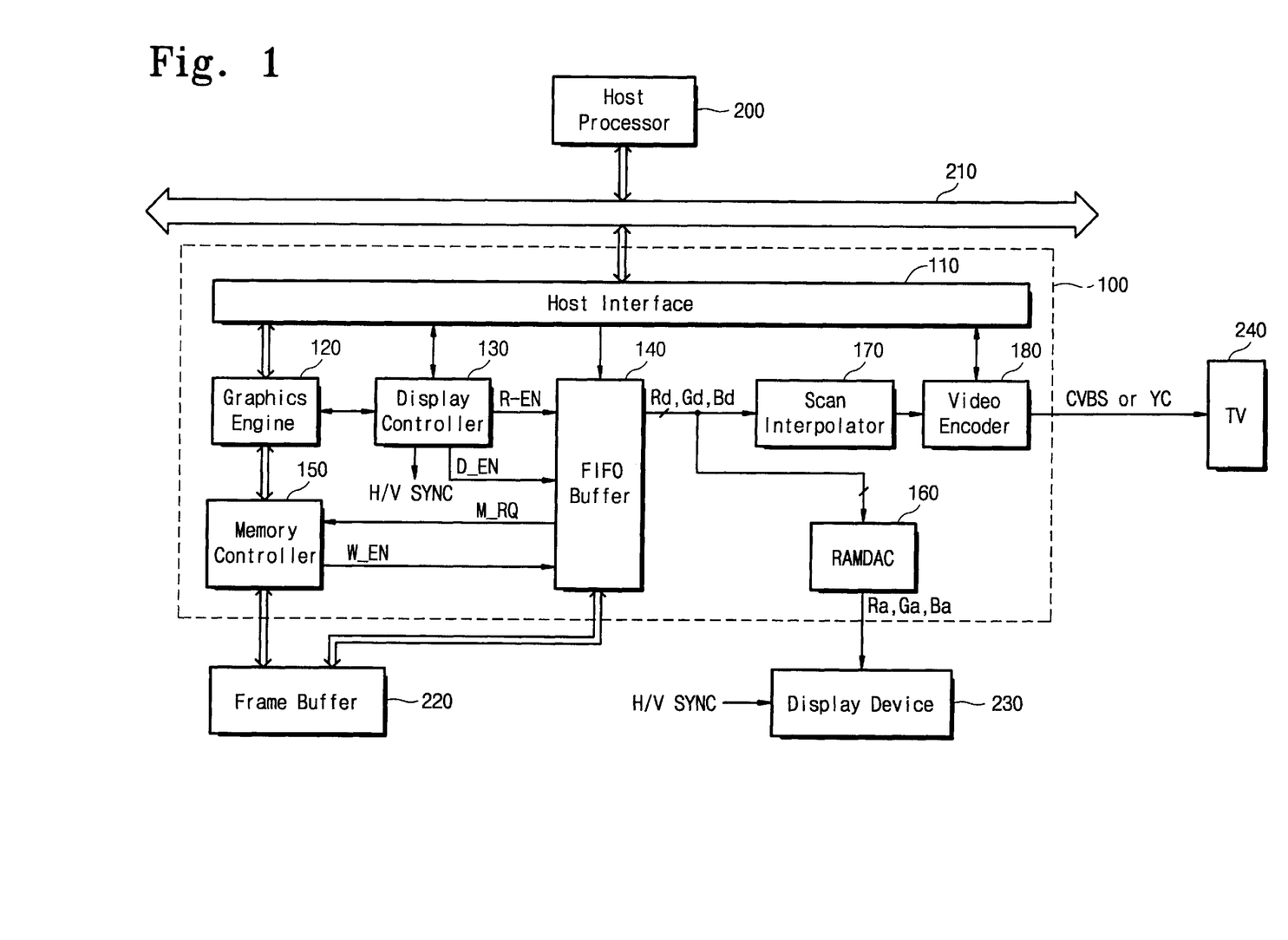
FIG. 1 is a block diagram of a preferred embodiment of a graphics subsystem according to the present invention.

FIG. 1 is a block diagram of a computer graphics subsystem or graphics accelerator 100 suitable for performing graphic data processing in a computer system according to a preferred embodiment of the invention. The graphics accelerator 100 is preferably integrated into a single integrated circuit or chip. The graphics accelerator 100 is connected to a host processor (CPU) 200 via a host bus 210 of a particular bus protocol, for example PCI (Peripheral Component Interconnect) bus, ISA (Industry Standard Architecture) bus, and the like. The graphics accelerator 100 is further connected to a frame buffer 220 including a single r-bit width data access port, where r is preferably 64 bits. Frame buffer 220 stores R (red), G (green), B (blue) video data, as well as additional colors and/or grey scale data, generated by application programs which are executed in host processor 200. Graphics accelerator 100 is further connected with a computer display device 230 (such as a CRT display device, an LCD device, etc.) and/or a television display 240. The graphics accelerator supports one or more m×n resolution display modes (where, m and n are positive integers), for example VGA mode (640×480 pixels), SVGA mode (800×600), and XGA mode (1024×768).

Figure 3A:
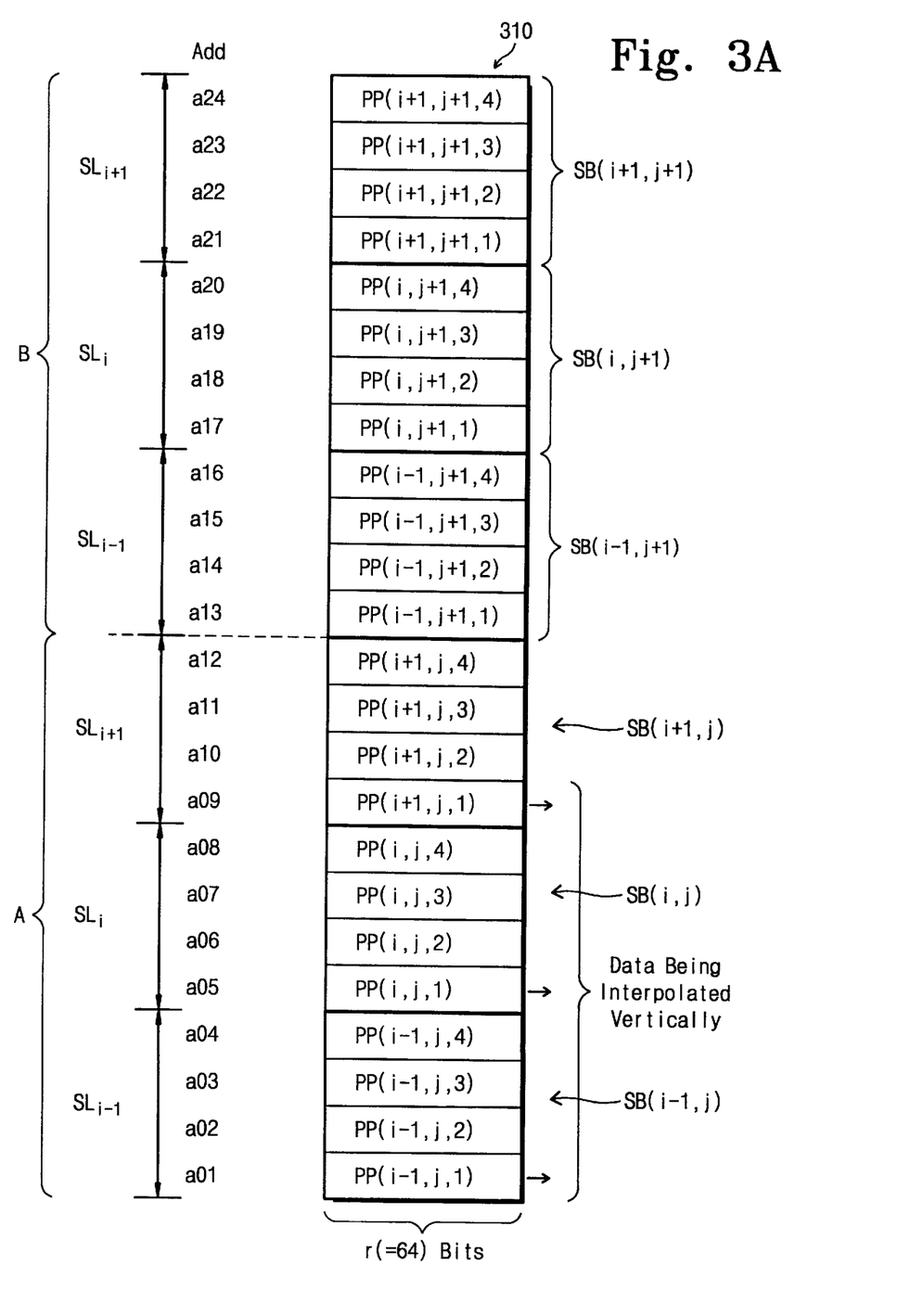
FIG. 3A is a schematic diagram illustrating the RAM array shown in FIG. 2.
Figure 3B:
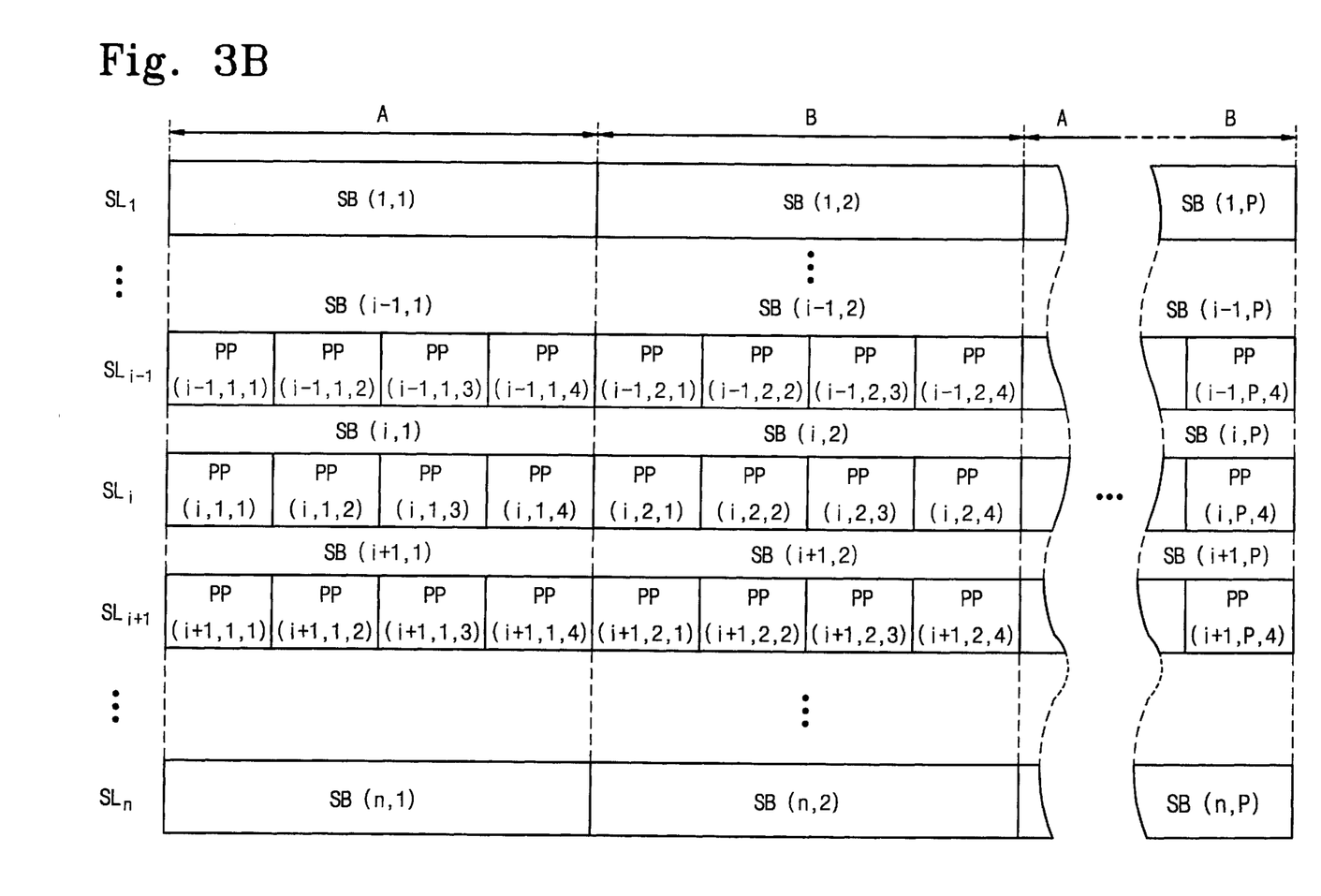
FIG. 3B illustrates a scanning sequence for data in the RAM array in accordance with a preferred embodiment of the present invention.

Referring to FIG. 3B, a video frame is comprised of n rows, or scan lines (where n=480, 600, 768, or the like). Each scan line $SL_i$ (where, i=1, 2, ..., n) includes p scan blocks SB(i,1), SB(i,2), ..., SB(i,p) (where, p is a multiple of 2, for example). Herein, reference symbol SB(i,j) designates the j-th scan block on the i-th scan line. Each scan block SB(i,j) (where, i=1, 2, ..., n; j=1, 2, ..., p) is formed of q pixel data packets PP(i,j,k) where q is a positive integer, and k=1, 2, ..., q. Each pixel data packet PP(i,j,k) comprises an r-bit wide video data corresponding to one or more pixels where r is a positive integer, for example, 8, 16, 24, 64, or the like. Scan interpolator 170 (see FIG. 1) performs the interpolation of the video data associated with three adjacent scan lines. Herein, reference symbol PP(i,j,k) represents k-th pixel data packet within j-th scan block on i-th scan line.

Returning to FIG. 1, in the graphics accelerator 100, a host interface 110 is connected to the host bus 210 and provides interface associated with host processor 200 according to the transfer protocol of the bus 210. Graphics engine 120, for example a VGA controller, a two-dimensional (2-D) graphics engine, a three-dimensional (3-D) graphics engine, or the like, manipulates the video data stored in the frame buffer 220 in accordance with commands and data from host processor 200.

Display controller 130 generates horizontal and vertical synchronizing signals H-SYNC and V-SYNC which are applied to control the display device 230. The controller 130 further generates a display enable signal D_EN synchronized with the horizontal synchronizing signal H-SYNC, which designates display enable periods.

FIFO buffer 140 includes FIFO storage space for buffering the video data provided by frame buffer 220. The FIFO buffer 140 includes a RAM array (described below) for data storage, and generates a memory read request signal M_RQ when there are any vacant storage locations available in the RAM array.

Memory controller 150 controls the read operation of frame buffer 220 at the request of FIFO buffer 140, i.e., in response to the memory read request signal M RQ, and further controls the write operation of FIFO buffer 140 via signal W_EN. The operation of the memory controller 150 is described in detail below.

RAMDAC (random access memory digital-to-analog converter) 160 converts digital video data signals $R_d$, $G_d$ and $B_d$ supplied by the FIFO buffer 140 into analog signals $R_a$, $G_a$ and $B_a$, and provides the converted data signals to display device 230, as well known.

Scan interpolator 170 vertically interpolates the video data provided by FIFO buffer 140, with respect to three adjacent scan lines $SL_{i-1}$, $SL_i$, $SL_{i+1}$ on a video frame (or screen). The line $SL_i$ represents a current scan line, while the lines $SL_{i-1}$, and $SL_{i+1}$ represent previous and following scan lines, respectively. In the event that the scan line $SL_i$ is the first line of a video frame, i.e., if i=1, then the data value corresponding to $SL_{i-1}$ is zero. Similarly, if the scan line $SL_i$ is the last line of a video frame, i.e., if i =n, then the data value corresponding to $SL_{i-1}$ is also zero.

Scan interpolator 170 performs horizontal interpolation of three adjacent vertically-interpolated scan lines with respect to three pixels on each scan line, in a process described in detail below. Further, it should be noted that RAMDAC 160 can alternatively be coupled to the output of the scan interpolator 170 so that interpolated data can be provided to display device 230.

Video encoder 180 converts the output data of scan interpolator 170, i.e., computer-oriented video data, into either composite video signals (CVBS) or super video signals (YC) for television display, and provides the converted signals to television 240.

Figure 2:
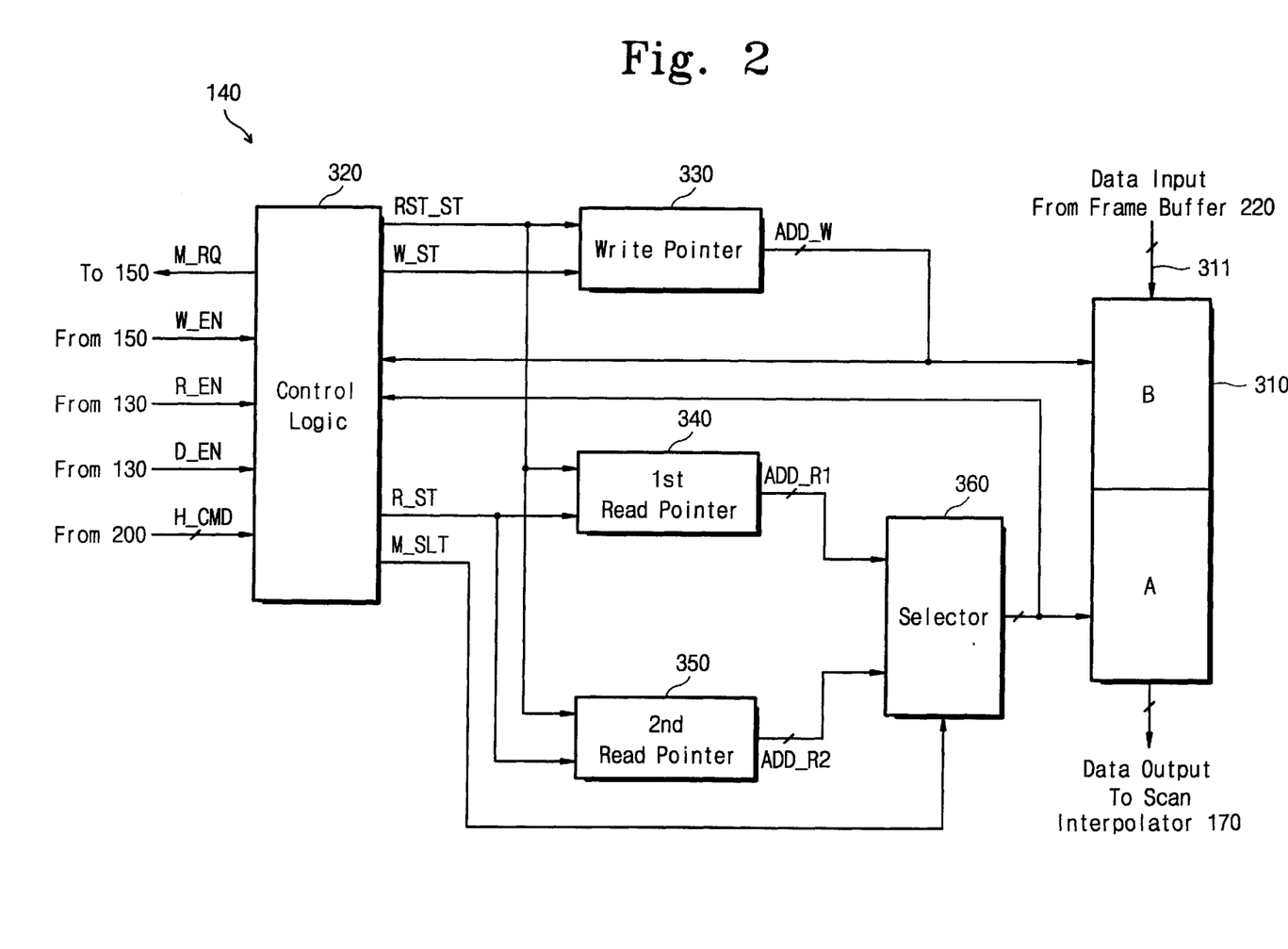
FIG. 2 is a block diagram illustrating a preferred circuit configuration of the FIFO buffer shown in FIG. 1.

Referring to FIG. 2, a preferred embodiment of FIFO buffer 140 includes a RAM array 310 for storing video data. The RAM array 310 includes first and second storage regions A and B of identical storage capacity, and stores video data 311 provided by the frame buffer 220. The buffer 140 further includes control logic 320, a write pointer 330, two read pointers 340 and 350, and an address selector 360.

Control logic 320 generates a plurality of control signals associated with video data buffering, as well as the above-described memory read request signal M_RQ. Specifically, the control logic 320 generates a write strobe signal W_ST in response to a write enable signal W_EN provided from memory controller 150. Also, the logic 320 generates a read strobe signal R_ST and a reset strobe signal RST_ST in response to a read enable signal R_EN and the display enable signal D_EN from display controller 130, respectively. Further, the logic 320 generates a mode select signal M_SLT to select the read mode of RAM array 310 in accordance with a command H_CMD issued from host processor 200. The mode select signal M_SLT is set at logic level one (e.g., a high level) when a computer display device (e.g., CRT device, LCD device) 230 is coupled to the system, and is set at logic level zero (e.g., a low level) when a television device 240 is coupled to the system.

Write address pointer 330 consists of a digital counter circuit, and produces a write address signal ADD_W in response to the write strobe signal W_ST from control logic 320. The write address ADD_W is used to store the video data 311 read from the frame buffer 220 into the RAM array 310. Read address pointer 340 likewise generates a first read address ADD_R1 in response to the read strobe signal R_ST. The first read address $ADD_{13}R1$ is intended to read the video data out of the RAM array 310 sequentially. Similarly, read address pointer 350 generates a second read address ADD_R2 in response to the read strobe signal R_ST from control logic 320. The second read address ADD_R2 is used for the data read-out from RAM array 310 discretely instead of sequentially (described below). The read pointers 340 and 350 are preferably implemented with digital counter circuits. Address selector 360 consisting of a multiplexer, selects one of the first and second read addresses ADD_R1 and ADD_R2 and provides the selected address to the RAM array 310 in response to the mode select signal M_SLT. The selector 360 selects the first read address ADD_RI in response to a mode select signal M SLT at a high level. When the mode select signal M_SLT is at a low level, the selector 360 selects the second read address ADD_R2.

Figure 4:
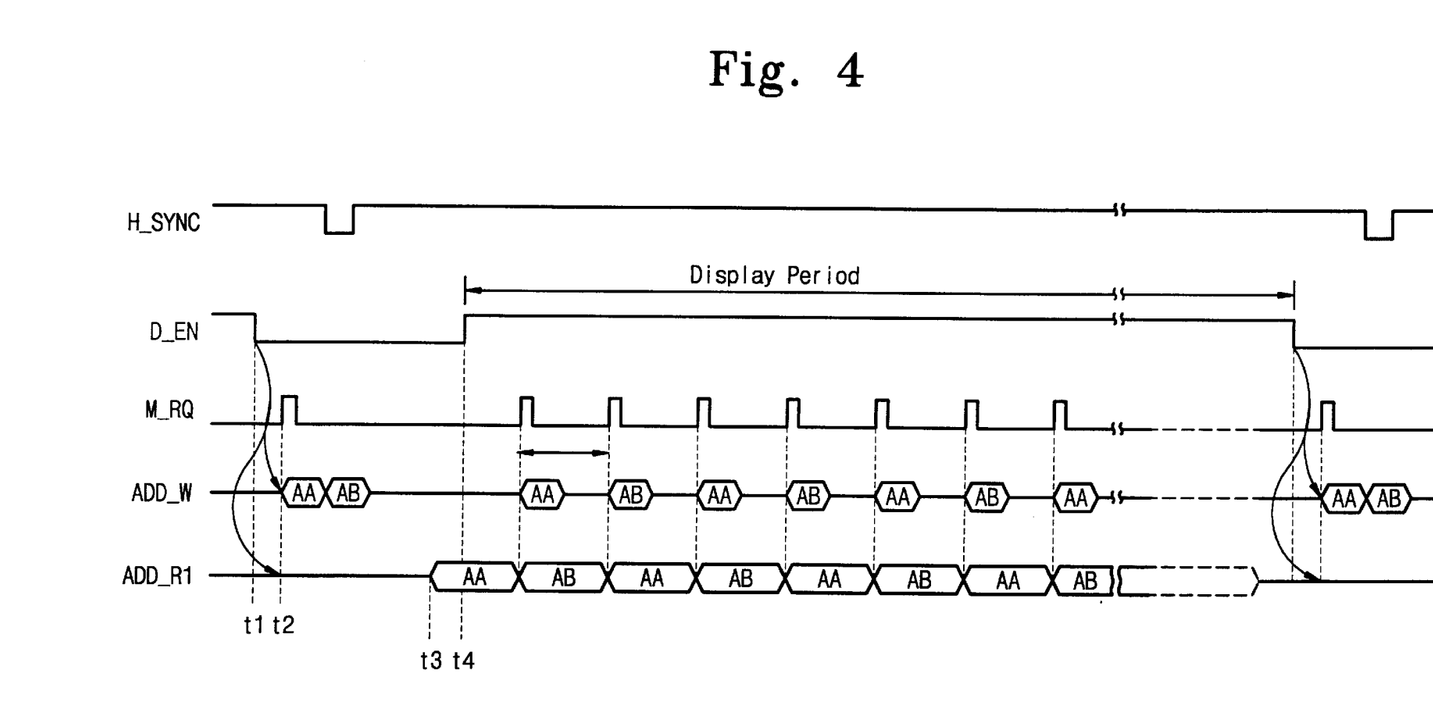
FIG. 4 is a timing diagram for write and read operations of the FIFO buffer in accordance with a preferred embodiment of the present invention.

FIG. 3A is an exemplary diagram of the layout of the RAM array 310 shown in FIG. 2, FIG. 3B is a diagrammatic illustration of the scanning sequence of the data in the RAM array 310, and FIG. 4 is a timing diagram for write and read operations of the FIFO buffer.

Referring to FIG. 3A, for illustrative purposes, RAM array 310 is formed of 24 memory locations having addresses a01–a24; each of the first and second storage regions, A and B respectively, consists of 12 locations. Each memory location has r (preferably, 64)-bit width corresponding to one pixel data packet PP(i,j,k). The storage region A or B stores the data corresponding to three adjacent scan lines $SL_{i-1}$, $SL_i$ and $SL_{i+1}$ each consisting of a plurality of scan blocks SB(i,j). If one scan block is, for example, made up of four pixel data packets, then the memory capacity of a storage region A or B is equal to 4×r bits (e.g., 4×64=256 bits), as shown in the figure.

Referring to the timing diagram of FIG. 4, address pointers 330, 340 and 350 shown in FIG. 2 are reset by the reset strobe signal RST_ST from control logic 320 at time t1 during which the display enable signal D_EN becomes deactivated. FIFO buffer 140 generates the memory read request signal M_RQ whenever the scanning of an arbitrary scan line has been completed.

Memory controller 150 controls the frame buffer 220 (see FIG. 1) in response to the memory read request signal M_RQ such that data of 3×4 (=q)×64(=r) bits, which corresponds to first scan blocks SB(i−1,1), SB(i,1) and SB(i+1,1) of three adjacent scan lines $SL_{i-1}$, $SL_i$ and $SL_{i+1}$, is sequentially and successively read from the frame buffer 220 while the display enable signal D_EN remains inactivated. Simultaneously, the memory controller 150 generates the write enable signal W_EN to instruct the FIFO buffer 140 to store the data output from the frame buffer 220. Subsequently, data corresponding to second scan blocks SB(i−1,2), SB(i,2) and SB(i+1,2) of the three adjacent scan lines $SL_{i-1}$, $SL_i$ and $SL_{i+1}$, (where, i=1, 2, . . . , or n) are also sequentially and successively read from the frame buffer 220 and written into the FIFO buffer 140. The remaining scan blocks SB(1,3), SB(1,4), . . . , SB(n,p) (see FIG. 3B) in the frame buffer 220 are also fed to the FIFO buffer 140 in the same manner.

For write operations of FIFO buffer 140, the write pointer 330 generates address signals AA and AB in normal fashion (i.e., sequentially) at time t2, as shown in FIG. 4 wherein reference character AA represents addresses a01–a12 for the storage region A of RAM array 310, and AB represents addresses a13–a24 for the storage region B of RAM array 310. During a write operation, RAM array 310 is filled with 24 pixel data packets PP(i−1,j,1), PP(i−1,j,2), . . . , PP(i+1, j+1,4), as shown in FIG. 3A. Consequently, with respect to three adjacent scan lines, the respective odd-numbered scan lines SB(1,1), SB(2,1), SB(3,1), SB(1,3), SB(2,1), SB(3,3), SB(i−1,p−1), SB(i,p−1), SB(i+1,p−1), . . . are stored in the storage region A, and the respective evennumbered scan lines SB(1,2), SB(2,2), SB(3,2), SB(1,4), SB(2,4), SB(3,4), . . . , SB(i−1,p), SB(i,p), SB(i+1,p), . . . are stored in the storage region B.

During read operations of FIFO buffer 140, the read enable signal R_EN becomes activated slightly prior to the display enable signal D_EN in consideration of the data transmission delay due to the scan interpolator 170. In the timing diagram of FIG. 4, although the read enable signal R_EN is not shown, it becomes activated at the time t3 prior to time t4 at which the display enable signal D_EN becomes activated.

Referring again to FIGS. 2 and 3A, when control logic 320 generates the read strobe signal R_ST in response to the read enable signal R_EN from display controller 130, first and second read pointers 340 and 350 are enabled to generate read addresses ADD_R1 and ADD_R2. At this time, the first address pointer 340 generates address ADD_R1 sequentially, i.e., the pointer 340 generates ADD_R1 in the following order: a01, a02, a03, . . . , a24, a01, a02, a03 . . . . Unlike the first address pointer 340, the second address pointer 350 generates ADD_R2 discretely, i.e, the pointer 350 generates address ADD_R2 in the following order: a01, a05, a09, a02, a06, a10, a03, a07, a11, a04, a08, a12, a13, a17, a21, a14, a18, . . . , a20, a24, a01, a05, . . . . According to the second address pointer 350, three pixel data packets PP(i−1,j,k), PP(ij,k) and PP(i+1,j,k) on a column of three adjacent scan lines $SL_{i-1}$, $SL_i$ and $SL_{i+1}$ can be sequentially provided to the scan interpolator 170, as can be seen in FIGS. 3A and 3B.

As described above, in the case where a computer display device 230 is coupled to the system, the first read address ADD_RI from the first address pointer 340 is selected by the address selector 360. The second read address ADD_R2 is selected when a television 240 is coupled to the system. Consequently, the first address pointer 340 is provided for the display device-oriented 230 video data addressing, and the address pointer 350 is prepared for addressing to interpolate the television-oriented 240 video data vertically.

Figure 5:
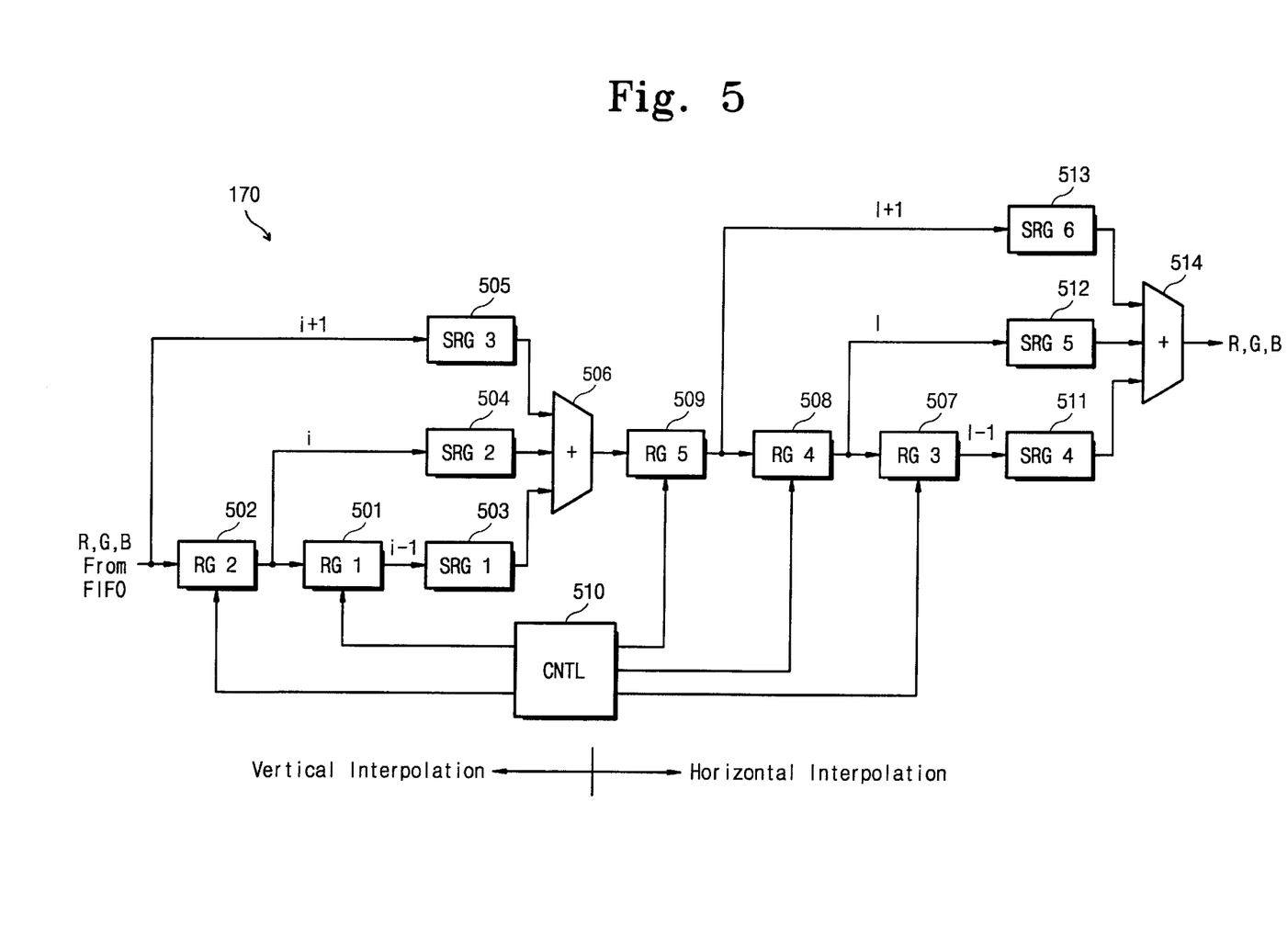
FIG. 5 is a block diagram illustrating a preferred circuit configuration of the scan interpolator shown in FIG. 1.

A circuit configuration of the scan interpolator 170 is shown in FIG. 5. The scan interpolator 170 performs vertical interpolation of pixel data corresponding to three pixels on a column of three adjacent scan lines. In addition, the interpolator 170 performs a horizontal interpolation of the first to third vertically-interpolated pixel data with respect to three pixels on each scan line.

Referring to FIG. 5, the scan interpolator 170 is comprised of registers 501, 502, 507, 508 and 509, a register controller 510, dividers 503, 504, 505, 511, 512 and 513, and adders 506 and 514. The register controller 510 controls read and write operations of registers 501, 502, 507, 508 and 509. Of three adjacent scan lines ($SL_{i+1}$, $SL_i$ and $SL_{i+1}$), a first register 501 stores first R, G, B pixel data associated with the first scan line ($SL_{i-1}$) and provided from FIFO buffer 140, and a second register 502 stores second pixel data associated with the second scan line ($SL_i$). The register controller 510 causes the registers 501 and 502 to output their stored data when third pixel data associated with the third scan line ($SL_{i+1}$) is provided from the FIFO buffer.

Figure 6A:
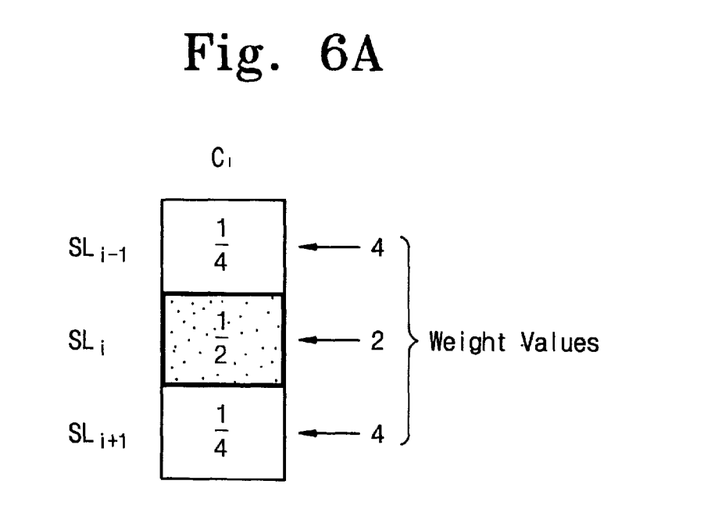
FIG. 6A illustrates vertical interpolation associated with three adjacent scan lines according to the present invention.

FIG. 6A is an exemplary diagrammatic illustration for describing vertical interpolation of three pixels arranged in a column $C_i$, with respect to three adjacent scan lines $SL_{i-1}$, $SL_i$ and $SL_{i+1}$.

As can be seen in FIGS. 5 and 6A, the current pixel (shaded block) on a column C, of scan line $SL_i$ is interpolated along with two adjacent pixels (non-shaded blocks) on the same column of the previous and next scan lines $SL_{i-1}$, $SL_i$ and $SL_{i+1}$, Divider 503 divides the output of the register 501 by a weight value (i.e., interpolation coefficient) of 4, and divider 504 adjusts the output of the register 502 by an interpolation coefficient of 2. The pixel data associated with the third scan line ($SL_{i+1}$) is applied to a divider 505 having an interpolation coefficient of 4. It can be seen that the pixel data value associated with the current scan line $SL_i$ is weighted twice as high as that associated with the previous or the following scan line $SL_{i-1}$, or $SL_{i+1}$. While other embodiments and coefficient values are equally applicable, in a preferred embodiment, dividers 503, 504 and 505, comprised shift registers to confer the benefits of speed and simplicity. For this reason, interpolation coefficients which are multiples of two are preferred. Thereafter, the outputs of the dividers 503, 504 and 505 are added together by adder 506, to complete vertical interpolation.

An output (i.e., vertically interpolated pixel data) of the adder 506 is provided to video encoder 180 (see FIG. 1) as current pixel data, without performing horizontal interpolation. In an alternative embodiment employing a computer display device 230, the output of the adder 506 is also provided to RAMDAC 160 as current pixel data. According to the above-described vertical interpolation process, the visible flicker effect due to the conversion of computer video data into television video data is substantially reduced.

Figure 6B:
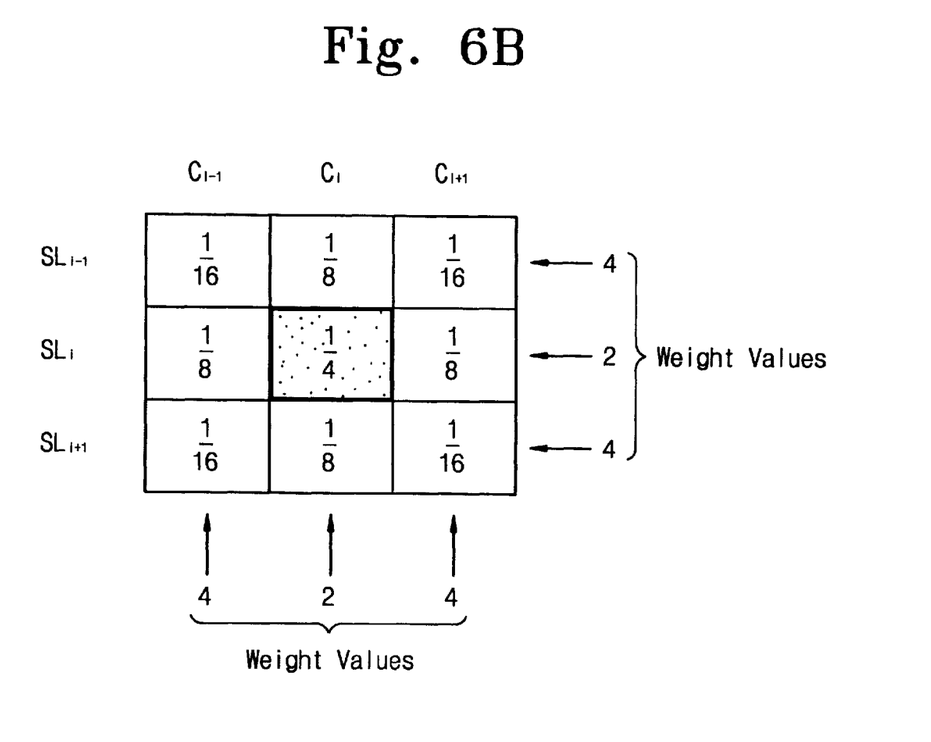
FIG. 6B illustrates vertical and horizontal interpolation associated with a 3×3 pixel matrix according to the present invention.

Referring to FIG. 6B, there is an exemplary diagrammatic illustration for describing vertical and horizontal interpolation associated with a pixel matrix of 3 rows and 3 columns. For vertical and horizontal interpolation, additional components are required for the scan interpolator 160 shown in FIG. 5.

Vertical interpolation of a current pixel (bold block in FIG. 6B) is performed in the same manner as described above. Thereafter, the horizontal interpolation of the current pixel is performed, as illustrated in FIGS. 5 and 6B. Specifically, registers 507, 508 and 509 store first through third outputs of the adder 506. Register controller 510 causes registers 507, 508 and 509 to output their stored data at the same time. Divider 511 adjusts the vertically-interpolated output of register 507 by an interpolation coefficient of 4, and divider 512 adjusts the output register 508 by an interpolation coefficient of 2. The output of the register 509 is adjusted at divider 513 by an interpolation coefficient of 4. It can be seen that the pixel data value associated with current column $C_I$ is weighted twice as high as that associated with the adjacent columns $C_{I-1}$ or $C_{I+1}$. Dividers 511, 512 and 513 preferably comprise shift registers. The respective outputs of dividers 511, 512 and 513 are added together at adder 514, to complete vertical and horizontal interpolation.

Output data (i.e., vertically and horizontally interpolated pixel data) of adder 514 is provided to video encoder 180 as a current pixel data. In the alternative embodiment, the output of the adder 514 can also be provided to RAMDAC 160.

According to the above-described vertical and horizontal interpolation, the visible flickers due to the conversion of computer video data into television video data can substantially be eliminated, resulting in high-quality display images on a computer or television display.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A graphics system for processing data generated by a host processor and for providing said data to a display device comprising:
   a first frame buffer having an r-bit wide data access port, where r is a positive integer, for storing video data generated by an application program executed on said host processor;
   a second buffer comprising:
      a RAM array for periodic storage of a portion of the video data stored in said frame buffer, and for periodic transmission of scan line data to said display device, said second buffer generating a read request control signal when at least one storage location therein is vacant;

a control logic for generating a read strobe control signal and a mode select control signal in response to a display control signal from said display device from said display device;

first and second address pointers for generating first and second read addresses respectively in response to the read strobe control signal; and an address selector for selecting one of the first and second read addresses and providing the selected address to said RAM array in response to the mode select control signal;

a controller for controlling read and write operations of said frame buffer and said second buffer in response to the read request control signal from said second buffer; and a scan interpolator for vertically interpolating said scan line data transmitted from said second buffer, with respect to a predetermined number of scan lines on the display device.

2. The graphics system according to claim 1, wherein each scan line includes p scan blocks, each scan block comprising q pixel data packets, and each pixel data packet comprising r-bit wide video data corresponding to one or more pixels (where, p, q and r are positive integers).

3. The graphics system according to claim 2, wherein said scan interpolator performs the interpolation of the video data associated with three adjacent scan lines $SL_{i-1}$, $SL_i$, and $SL_{i+1}$ (where, i=1, 2, . . . , n, and where n is a positive integer) of a video frame.

4. The graphics system according to claim 3, wherein the controller controls said frame buffer in response to the read request control signal in such a manner that a first data of 3×q×r bits and a second data of 3×q×r bits, which correspond to first scan blocks of the three adjacent scan lines and second scan blocks of the three adjacent scan lines, respectively, are read out from said frame buffer sequentially and successively while a display control signal remains inactive; and the controller controls said frame buffer in response to the read request control signal in such a manner that a third data of 3×q×r bits and a fourth data of 3×q×r bits, which correspond to odd-numbered scan blocks of the three adjacent scan lines and even-numbered scan blocks of the three adjacent scan lines, respectively, are read out from said frame buffer alternately and at a predetermined time interval while the display control signal remains active.

5. The graphics system according to claim 4, wherein said frame buffer operates in a burst read out mode where q×r bits data relating to each scan line are successively read out from said frame buffer.

6. The graphics system according to claim 4, wherein the second buffer comprises first and second storage regions which have identical storage capacity.

7. The graphics system according to claim 6, wherein the second buffer, while the display control signal remains inactive, stores the data read out of said frame buffer into said first and second storage regions sequentially in response to a write enable control signal from the controller; and wherein the second buffer, while the display control signal remains active, provides 3×r bits data, which are stored in one of said first and second storage regions and correspond to a column of the adjacent scan lines, to said scan interpolator in response to a read enable control signal from said controller, and stores the data read out of said frame buffer in the other of said first and second storage regions in response to the write enable control signal.

8. The graphics system according to claim 1, wherein the second buffer comprises:

a RAM array including first and second storage regions which have identical storage capacity, for storing the video data provided from said frame buffer;

a control logic for generating a write strobe control signal, a read strobe control signal and a mode select control signal in response to a display control signal from said display controller, a write enable control signal from a memory controller and a host command issued from said host processor, respectively;

a first address pointer for generating a write address in response to the write strobe control signal, the write address being used to write the video data provided from said frame buffer into said RAM array;

a second address pointer for generating a first read address in response to the read strobe control signal, the first read address being used to read the video data stored in said RAM array successively;

a third address pointer for generating a second read address in response to the read strobe control signal, the second read address being used to read the video data stored in said RAM array discretely; and an address selector for selecting one of the first and second read addresses and providing the selected address to said RAM array, in response to the mode select control signal.

9. The graphics system according to claim 1, wherein said scan interpolator performs a vertical interpolation of pixel data corresponding to three pixels on a column of three adjacent scan lines.

10. The graphics system according to claim 9, wherein said scan interpolator further performs a horizontal interpolation of pixel data with respect to adjacent three pixels on each vertically-interpolated scan line.

11. The graphics system according to claim 1, wherein said scan interpolator comprises:

a first register for storing a first pixel data provided from said second buffer and associated with the (i-1)-th scan line ($SL_{i-1}$);

a second register for storing a second pixel data provided from said second buffer and associated with the i-th scan line ($SL_i$);

a register controller for controlling read and write operations of said first and second registers, said register controller instructing said first and second registers to output their stored data when a third pixel data associated with the (i+1)-th scan line ($SL_{i+1}$) is provided from said FIFO buffer;

a first divider for dividing an output of said first register by a first interpolation coefficient;

a second divider for dividing an output of said second register by a second interpolation coefficient;

a third divider for dividing third pixel data associated with the (i+1)-th scan line ($SL_{i+1}$) by a third interpolation coefficient; and an adder for adding outputs of said first to third dividers together.

12. The graphics system according to claim 11, wherein the first and third interpolation coefficients equal 4 and wherein the second interpolation coefficient equals 2.

13. The graphics system according to claim 1, wherein said scan interpolator further comprises:

a first register for storing a first pixel data provided from said second buffer and associated with the (i−1)-th scan line ($SL_{i-1}$);

a second register for storing a second pixel data provided from said second buffer and associated with the i-th scan line ($SL_i$);

a first divider for dividing an output of said first register by a first interpolation coefficient;

a second divider for dividing an output of said second register by a second interpolation coefficient;

a third divider for dividing third pixel data associated with the (i+1)-th scan line ($SL_{i+1}$) by a third interpolation coefficient;

a first adder for summing the outputs of the first, second, and third dividers;

a third register for storing a first output of said first adder;

a fourth register for storing a second output of said first adder;

a fifth register for storing a third output of said first adder;

a register controller for controlling read and write operations of said first to fifth registers, said register controller instructing said first and second registers to output their stored data when a third pixel data associated with the (i+1)-th scan line ($SL_{i+1}$) is provided from said second buffer;

a fourth divider for dividing an output of said third register by a fourth interpolation coefficient;

a fifth divider for dividing an output of said fourth register by a fifth interpolation coefficient;

a sixth divider for dividing an output of said fifth register by a sixth interpolation coefficient; and a second adder for summing the outputs of the fourth, fifth, and sixth dividers.

14. The graphics system according to claim 13, wherein the first, third, fourth and sixth interpolation coefficients equal 4 and wherein the second and fifth interpolation coefficients equal 2.

15. The graphics system according to claim 1, further comprising a graphics engine for manipulating the video data stored in said frame buffer on the basis of commands issued from said host processor, and a random access memory digital-to-analog converter (RAMDAC) for converting digital outputs of said second buffer into analog signals and providing the analog signals to said display device.

16. The graphics system according to claim 1, further comprising a video encoder for converting an output of said scan interpolator into television-oriented video data.

17. The graphics system according to claim 1, wherein the second buffer comprises a first-in-first-out (FIFO) buffer.

18. The graphics system according to claim 1, wherein the video data comprises red, green, and blue video data.

19. The graphics system according to claim 1, wherein the video data comprises grey scale data.

20. The graphics system according to claim 1, wherein the frame buffer comprises single-port DRAM.

21. A graphics system for processing data generated by a host processor and for providing said data to a display device comprising:

a first frame buffer having an r-bit wide data access port, where r is a positive integer, for storing video data generated by an application program executed on said host processor;

a second buffer for periodic storage of a portion of the video data stored in said frame buffer, and for periodic transmission of scan line data to said display device, said second buffer generating a read request control signal when at least one storage location therein is vacant; said second buffer comprising:

a RAM array including first and second storage regions which have identical storage capacity, for storing the video data provided from said frame buffer;

a control logic for generating a write strobe control signal, a read strobe control signal and a mode select control signal in response to a display control signal from said display controller, a write enable control signal from a memory controller and a host command issued from said host processor, respectively;

a first address pointer for generating a write address in response to the write strobe control signal, the write address being used to write the video data provided from said frame buffer into said RAM array;

a second address pointer for generating a first read address in response to the read strobe control signal, the first read address being used to read the video data stored in said RAM array successively;

a third address pointer for generating a second read address in response to the read strobe control signal, the second read address being used to read the video data stored in said RAM array discretely; and an address selector for selecting one of the first and second read addresses and providing the selected address to said RAM array, in response to the mode select control signal;

a controller for controlling read and write operations of said frame buffer and said second buffer in response to the read request control signal from said second buffer; and a scan interpolator for vertically interpolating said scan line data transmitted from said second buffer, with respect to a predetermined number of scan lines on the display device.

22. A graphics system for processing data generated by a host processor and for providing said data to a display device comprising:

a first frame buffer having an r-bit wide data access port, where r is a positive integer, for storing video data generated by an application program executed on said host processor;

a second buffer for periodic storage of a portion of the video data stored in said frame buffer, and for periodic transmission of scan line data to said display device, said second buffer generating a read request control signal when at least one storage location therein is vacant;

a controller for controlling read and write operations of said frame buffer and said second buffer in response to the read request control signal from said second buffer; and a scan interpolator for vertically interpolating said scan line data transmitted from said second buffer, with respect to a predetermined number of scan lines on the display device, wherein said scan interpolator comprises:

a first register for storing a first pixel data provided from said second buffer and associated with the (i−1)-th scan line ($SL_{i-1}$);

a second register for storing a second pixel data provided from said second buffer and associated with the i-th scan line ($SL_i$);

a register controller for controlling read and write operations of said first and second registers, said register controller instructing said first and second registers to output their stored data when a third pixel data associated with the (i+1)-th scan line ($SL_{i+1}$) is provided from said FIFO buffer;

a first divider for dividing an output of said first register by a first interpolation coefficient;

a second divider for dividing an output of said second register by a second interpolation coefficient;

a third divider for dividing third pixel data associated with the (i+1)-th scan line ($SL_{i+1}$) by a third interpolation coefficient; and an adder for adding outputs of said first to third dividers together.

23. The graphics system according to claim 22, wherein the first and third interpolation coefficients equal 4 and wherein the second interpolation coefficient equals 2.

24. A graphics system for processing data generated by a host processor and for providing said data to a display device comprising:

a first frame buffer having an r-bit wide data access port, where r is a positive integer, for storing video data generated by an application program executed on said host processor;

a second buffer for periodic storage of a portion of the video data stored in said frame buffer, and for periodic transmission of scan line data to said display device, said second buffer generating a read request control signal when at least one storage location therein is vacant;

a controller for controlling read and write operations of said frame buffer and said second buffer in response to the read request control signal from said second buffer; and a scan interpolator for vertically interpolating said scan line data transmitted from said second buffer, with respect to a predetermined number of scan lines on the display device, wherein said scan interpolator comprises:

a first register for storing a first pixel data provided from said second buffer and associated with the (i−1)-th scan line ($SL_{i-1}$);

a second register for storing a second pixel data provided from said second buffer and associated with the i-th scan line ($SL_i$);

a first divider for dividing an output of said first register by a first interpolation coefficient;

a second divider for dividing an output of said second register by a second interpolation coefficient;

a third divider for dividing third pixel data associated with the (i+1)-th scan line ($SL_{i+1}$) by a third interpolation coefficient;

a first adder for summing the outputs of the first, second, and third dividers;

a third register for storing a first output of said first adder;

a fourth register for storing a second output of said first adder;

a fifth register for storing a third output of said first adder;

a register controller for controlling read and write operations of said first to fifth registers, said register controller instructing said first and second registers to output their stored data when a third pixel data associated with the (i+1)-th scan line ($SL_{i+1}$) is provided from said second buffer;

a fourth divider for dividing an output of said third register by a fourth interpolation coefficient;

a fifth divider for dividing an output of said fourth register by a fifth interpolation coefficient;

a sixth divider for dividing an output of said fifth register by a sixth interpolation coefficient; and a second adder for summing the outputs of the fourth, fifth, and sixth dividers.

25. The graphics system according to claim 24, wherein the first, third, fourth and sixth interpolation coefficients equal 4 and wherein the second and fifth interpolation coefficients equal 2.

* * * * *